Figure 1:
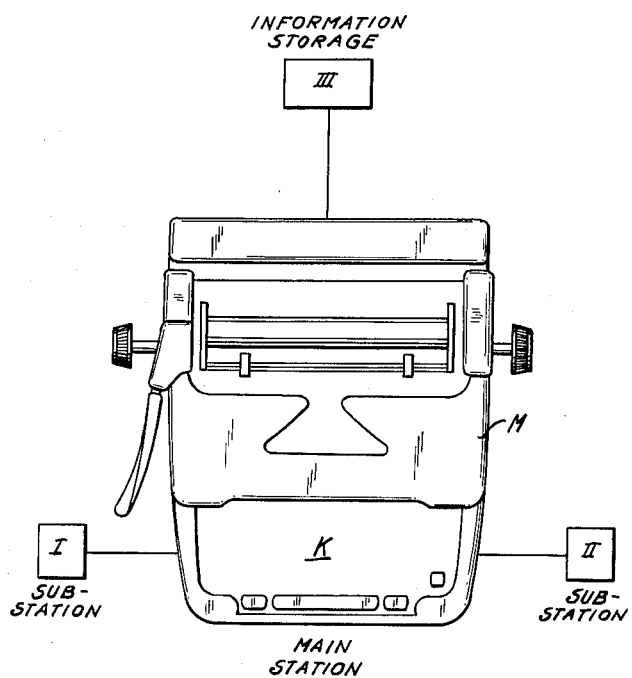

Feb. 22, 1966  F. BRÄUNIG  3,237,165
REMOTE CONTROLLED OFFICE MACHINE SYSTEM
Filed July 31, 1962  2 Sheets-Sheet 1

INVENTOR.
Friedrich Bräunig
BY
Michael S. Striker
Atty

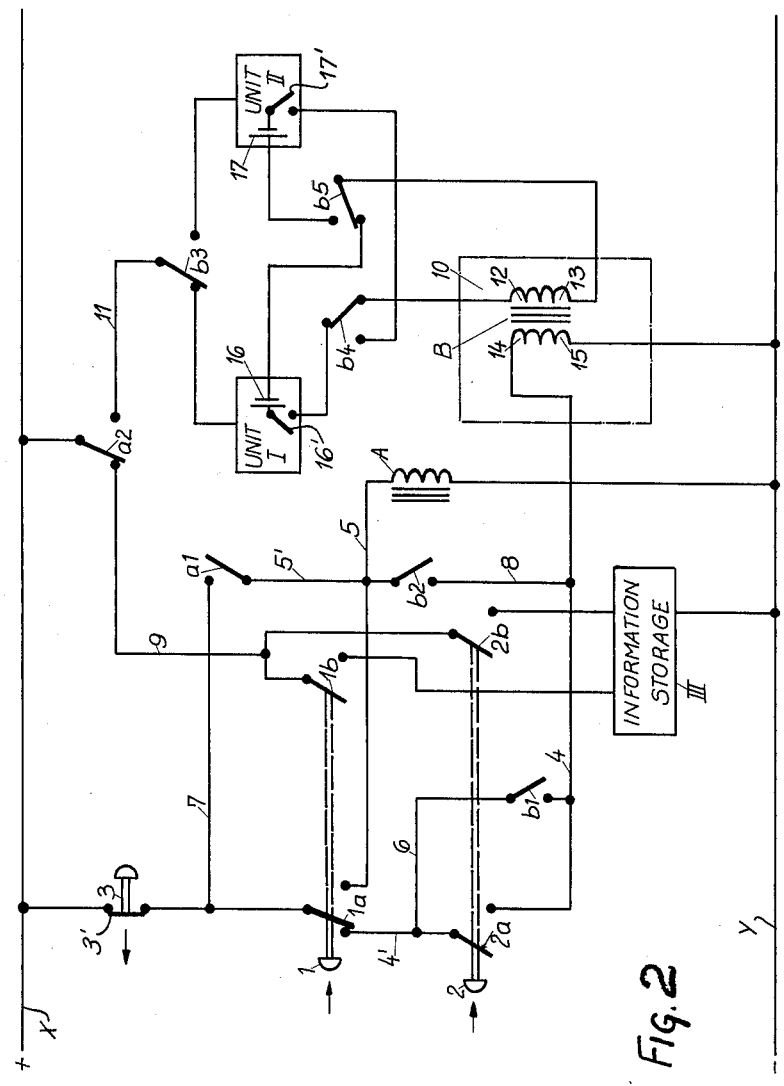

United States Patent Office 3,237,165
Patented Feb. 22, 1966

3,237,165
REMOTE CONTROLLED OFFICE
MACHINE SYSTEM
Friedrich Bräunig, Wilhelmshaven, Germany, assignor to
Olympia-Werke A.G., Wilhelmshaven, Germany
Filed July 31, 1962, Ser. No. 213,734
Claims priority, application Germany, Aug. 4, 1961,
O 8,211
8 Claims. (Cl. 340—147)

The present invention concerns an information processing arrangement which is mainly composed of a main station office machine connected for cooperation with at least two sub-station machines and with an information storage device. The main station office machine may be remote controlled.

It is one object of this invention to provide for control means in the main station office machine for selectively connecting the main station office machine either with one or the other of the sub-station machines or with the information storage device.

It is a further object of this invention to provide in said control means also means permitting any one of the sub-stations to put the other sub-station in circuit.

With above objects in view the invention includes in an information processing arrangement composed of a main station office machine connected for cooperation with at least two sub-station machines and with an information storage device, in combination, first and second independently actuatable control means in said main station office machine for operatively connecting upon actuation thereof said main station office machine selectively with one or the other of said sub-station machines, respectively, the actuation of one of said first and second control means for establishing connection with one of said sub-station machines causing automatically disconnection of the other one of said sub-station machines; and third control means operable independently of said first and second control means but cooperating therewith in such a manner that simultaneous actuation of said third control means and any one of said first and second control means causes establishment of operative connection between said main station office machine and said information storage device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic illustration of an information processing arrangement including a main station office machine, two sub-station machines and an information storage device; and FIG. 2 is a schematic circuit diagram illustrating one embodiment of the invention.

Referring now to FIG. 1, a main station office machine M shows a conventional keyboard K, the individual keys not being shown in detail. Operatively connected with the machine M are two sub-station machines I and II not illustrated in detail, and an information storage device III also not shown in greater detail because these details do not form part of this invention except for one feature of the sub-station machines as illustrated in FIG. 2. The main station machine M is equipped, in addition to the conventional keys of the keyboard K with a first and second control switch key 1 and 2, respectively, for selectively establishing connection between the machine M and the sub-station machines I and II, respectively, and with a further control switch key 3 which depending upon whether it is actuated or not actuated simultaneously with the keys 1 or 2 determines whether the actuation of the keys 1 or 2 is to establish connection between the machine M and the respective sub-station machines I and II, or whether the actuation of either one of the keys 1 or 2 is to establish connection between the machine M and the information storage device III.

FIG. 2 illustrates the components and interconnections in a control arrangement according to the invention. The control arrangement is supplied with electric energy through two feed lines X and Y carrying positive and negative potential, respectively, which may be supplied from a source of electric energy or from the machine M.

The control arrangement according to FIG. 2 comprises a switching means the embodiment of which is a first relay having a coil A and circuit directing means in the form of relay switch contacts $a_1$ and $a_2$ having normally the positions shown in FIG. 2, and a second relay having a core B, a main coil 14, 15 and a second coil 12, 13, and relay switch contacts $b_1$, $b_2$, $b_3$, $b_4$ and $b_5$, all these switch contacts having normally the position shown in FIG. 2.

The first control means comprise a double-pole switch arrangement including a change-over contact $1a$ and a normally open switch $1b$, both mechanically coupled with each other and operable by means of the above mentioned switch key 1 so as to move the switch $1a$ to its alternative position and the switch $1b$ to closed position. The relay coil A is connected at one end with the line Y and at the other end by line 5 with the normally open contact of the switch $1a$. The latter is connected via the normally closed contact $3'$ with the positive line X, the contact $3'$ being movable to open position by the switch key 3 which forms part of the third control means of the arrangement. A junction point between switch $3'$ and switch $1a$ is connected by line 7, via relay contact $a_1$, and line $5'$ with the relay coil A so that after actuation of the switch key 1 the relay coil A is held energized by the now closed relay contact $a_1$.

The second control means comprise two normally open switches $2a$ and $2b$ coupled with each other mechanically and operable by actuation of the second switch key 2 for being moved to closed position. The switch $2a$ is connected by line $4'$ with the normally engaged contact of switch $1a$, and the stationary contact of switch $2a$ is connected by line 4 with the relay coil 14, 15. A junction point in the line $4'$ is connected by line 6 via the normally open relay contact $b_1$ with a junction point in line 4 so that when the relay coil 14, 15 is energized it is held in this condition by the now closed contact $b_1$. A second junction point in the line 4 is connected by line 8 via the relay contact $b_2$ with a junction point in line 5 so that when switch key 2 is actuated and the coil 14, 15 is energized also the relay coil A will be energized.

The information storage III is connected with the normally not engaged contacts of the switches $1_b$ and $2_b$, which are interconnected with each other and connected via line 9 with one stationary contact of the change-over relay contact $a_2$ the movable arm whereof is connected with the positive line X. The other stationary contact of the switch $a_2$ is connected by line 11 with the movable changeover switch $b_3$. The normally engaged stationary contact of this switch is connected with the sub-station unit I and the other stationary contact is connected with the sub-station unit II. The unit I comprises a local source of energy 16 the positive terminal whereof is connected via a normally open switch $16'$ with one stationary contact of the change-over relay switch $b_4$ while the negative terminal of source 16 is connected with the normally engaged contact of the change-over relay switch $b_5$. The sub-station unit II also comprises a local source of energy 17 the positive terminal whereof is connected with the normally not engaged contact of the relay switch $b_5$ while the negative terminal of source 17 is connected via a normally open switch 17' with the normally not engaged contact of relay switch $b_4$. The movable switch arms $b_4$ and $b_5$ are connected in series with the second relay coil 12, 13.

The control arrangement according to FIG. 2 can be operated in various ways.

(1) Connecting the machine M with one of the sub-station machines I or II.

The switch key 3 and the related switch 3' remain in normal position. Hereby that mode of operation is selected in which the information storage device III remains unconnected with the main station machine M.

If it is desired to connect the machine M with the unit I then the switch key 1 is actuated whereby switch 1$a$ is moved to its alternative position and switch 1$b$ is closed. Consequently the relay coil A is energized via line 5, the holding contact $a_1$ is closed and the relay contact $a_2$ is moved to its alternative position so that positive potential from line X is applied via line 11 and switch $b_3$ in normal position to the unit 1.

If it is desired to connect the main station machine M with the sub-station unit II, then the switch key 2 is actuated whereby the switches 2$a$ and 2$b$ are moved to closed postion. Consequently the relay coil 14, 15 is energized via closed switch 3', switch 1$a$ in normal position, switch 2$a$ in closed position and line 4. Relay switch contacts $b_1$ and $b_2$ are moved to closed position and the relay switch contacts $b_3$, $b_4$ and $b_5$ are moved to their alternative positions. The relay coil 14, 15 is held in energized condition by the closed contact $b_1$. The closing of the contact $b_2$ causes energization of the relay coil A so that the relay switch contact $a_2$ is moved to its alternative position. Consequently now positive potential is applied from the line X via switch $a_2$, line 11 and switch $b_3$ to the unit II.

(2) Connection of the main station machine M with the information storage device III.

The switch key 3 is actuated so as to move the switch 3' to open position. Hereby energization of the relay coils A and 14, 15 is prevented because no energy can reach them via switch 1$a$ and line 5 or via switch 2$a$ and line 4.

While switch 3' is still in open position either one of the switch keys 1 or 2 may be actuated. If key 1 is actuated and thereby switch 1$b$ is closed, positive potential is applied from the line X via switch $a_2$ in normal position and line 9 to the information storage device III. If key 2 is actuated and switch 2$b$ is closed, positive potential is applied to the information storage III in an analogous manner.

(3) Activation of one sub-station unit by the other one.

(a) It may be assumed that the unit I has been connected in one or the other manner as described above, i.e. that the relay coil A is held in energized condition via closed contact 3', line 7, closed contact $a_1$, lines 5' and 5 so that the contact $a_2$ is in the position in which it applies positive potential to line 11. The second relay i.e. the coils 14, 15 and 12, 13 are not energized. If now in the sub-station unit I, which may operate with a perforated tape, an order should appear to stop and to initiate operation of the other sub-station unit II, e.g., on account of a corresponding signal appearing as a corresponding perforation in the perforated tape, then this signal would cause the switch 16' to close whereby a current from the source 16 would be caused to flow via switch $b_4$ through coil 12, 13 of the second relay and back to the source 16 via switch $b_5$. This current would flow through the coil 12, 13 in the same direction as the current would flow through coil 14, 15 when the latter is energized. Consequently the second relay is energized and will hold itself in that condition via the now closed relay contact $b_1$. All the other contacts of the second relay are also moved to their alternative position. Consequently now the unit I is disconnected and positive potential is applied from line X via switch $a_2$, line 11, and switch $b_3$ in its alternative position to the unit II.

(b) If the sub-station unit II has been connected in any one of the manners described above i.e. if the relay coils A and the relay coil 14, 15 of the second relay are held in energized condition the condition may arise that in the sub-station unit II the order may arise in the manner described above to stop and to initiate operation of the other sub-station unit I. In this case the switch 17' would be closed so that now current would flow from the positive terminal of the source 17 through switch $b_5$, relay coil 12, 13, switch $b_4$ and back to the negative terminal of the source 17. However, in this case the current flow through the coil 12, 13 is in opposite direction to that in which the current would flow or is flowing through the coil 14, 15. The two opposite currents balance out each other so that the second relay is now deenergized. Consequently all the relay switches $b_1$, $b_2$, $b_3$, $b_4$ and $b_5$ return to their normal positions. However, the relay coil A remains in energized condition via the still closed holding contact $a_1$. Consequently positive potential is now applied from the positive line X via switch $a_2$ in its alternative position, line 11 and contact $b_3$ in its normal position to the unit I. It can be seen that the last described operation is due to the fact that the relay coils 12, 13 and 14, 15 are inductively coupled with each other by being mounted on a common core B within the arrangement indicated by the frame 10.

While the invention has been illustrated and described as embodied in an information processing arrangement composed of a main station office machine connected for cooperation with at least two sub-station machines and with an information storage device by means of first, second and third control means cooperating with each other, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

I claim:

1. In an information processing arrangement composed of a main station office machine connected for cooperation with the two sub-station machines and with an information storage device, in combination, first independently actuatable control means in said main station office machine;

first switching means having circuit directing means associated therewith, actuation of said first control means causing said first switching means to operate and a path to be created from said main station office machine through said circuit directing means to one of said sub-station machines;

second independently actuatable control means in said main station office machine;

second switching means having a plurality of circuit directing means associated therewith, actuation of said second control means causing said first and second switching means to operate and a path to be created from said main station office machine through the circuit directing means associated with said first switching means, circuit directing means associated with said second switching means and the other of said sub-stations;

third independently actuatable control means, actuation of said third control means preventing any potential from being applied to said first or second switching means when either of said first and second control means is actuated simultaneously with said third control means to create a path from said main station office machine through the circuit directing means associated with said first switching means, the circuit directing means associated with the operated one of said first and second control means and said information storage device.

2. In an information processing arrangement composed of a main station office machine connected for cooperation with two sub-station machines and with an information storage device, in combination, first independently actuatable control means in said main station office machine, said first control means comprising first control switch means;

first switching means having circuit directing means associated therewith, actuation of said first control means causing said first switching means to operate and a path to be created from said main station office machine through said circuit directing means to one of said sub-station machines, said first switching means comprising first relay means connectable to a source of energy upon actuation of said first control switch means;

second independently actuatable control means in said main station office machine, said second control means comprising second control switch means;

second switching means having a plurality of circuit directing means associated therewith, actuation of said second control means causing said first and second switching means to operate and a path to be created from said main station office machine through the circuit directing means associated with said first switching means, circuit directing means associated with said second switching means and the other of said sub-stations, said second switching means comprising second relay means connectable to a source of energy upon actuation of said second control switch means, said circuit directing means comprising relay switch contact means so interconnected with each other and with said sub-station machines that upon energization of said first relay means only said one of said sub-station machines is connected with said main station office machine and upon energization of said second relay means only said other of said sub-station machines is connected with said main station office machine;

third independently actuatable control means, actuation of said third control means preventing any potential from being applied to said first or second switching means when either of said first and second control means is actuated simultaneously with said third control means to create a path from said main station office machine through the circuit directing means associated with said first switching means, the circuit directing means associated with the operated one of said first and second control means and said information storage device.

3. An arrangement according to claim 2, wherein each of said first and second relay means comprises a different holding relay switch contact for holding the respective relay means in energized condition once it has been energized.

4. An arrangement according to claim 3, wherein said first and second control switch means comprise each a first and a second switch arrangement coupled for joint operation, said first switch arrangements being connected in series and said different holding relay switch contacts being connected in parallel with said first switch arrangements, respectively.

5. An arrangement according to claim 4, wherein said second relay means comprise a relay switch contact connected between said first switch arrangement of said second control switch means and said first relay means for energizing the latter when said second relay means are energized.

6. An arrangement according to claim 5, wherein said third control means include normally closed third control switch means connected between said main station machine and said first control switch means for disconnecting said first and second relay means from said main station machine when said third control switch means is moved to open position.

7. An arrangement according to claim 6, wherein said first relay means comprises a change-over relay switch contact movable between a normal position and an alternative position, in the latter position permitting connection of said main station machine with said sub-station machines, said second switch arrangements of said first and second control switch means being both connected in parallel with each other between said information storage device and said change-over relay switch contact in such a manner that when said change-over relay switch contact is in its normal position and when said third control switch means is in open position while either one of said first and second control switch means is actuated, said main station machine is connected with said information storage device.

8. An arrangement according to claim 7, wherein each of said sub-station machines comprises a source of electric energy and a normally open control switch, and wherein said second relay means comprises a first relay coil energizable upon actuation of said first switch arrangement of said second control switch means, and a second relay coil inductively coupled with said first relay coil and energizable by said source of electric energy of either one of said sub-station machines upon closing of the respective control switch, change-over relay switch contacts forming part of said second relay means being so arranged between said second relay coil and said sub-station machines that when said first relay means is in energized condition and said control switch in said first sub-station machine is closed, said second relay means is energized and said first sub-station machine is disconnected and said second sub-station machine is connected with the main station machine, while when said first and second relay means are in energized condition and said control switch in said second sub-station machine is closed, said second relay means is deenergized by reversed current flow in said second relay coil and said second sub-station machine is disconnected and said first sub-station machine is connected with the main station machine.

References Cited by the Examiner
UNITED STATES PATENTS
2,712,101  6/1955  Salati _____ 317—137

NEIL C. READ, *Primary Examiner.*

P. XIARHOS, *Assistant Examiner.*